United States Patent [19]

Herbert

[11] Patent Number: 5,603,588
[45] Date of Patent: Feb. 18, 1997

[54] PIPELINE WEIGHT AND METHOD OF INSTALLING THE SAME

[75] Inventor: Grant D. Herbert, Cold Lake, Canada

[73] Assignees: Ried's Welding (1981) Inc.; Key-May Industries Ltd., both of Grand Centre, Canada

[21] Appl. No.: 542,166

[22] Filed: Oct. 12, 1995

[30] Foreign Application Priority Data

Sep. 21, 1995 [CA] Canada ................................ 2158801

[51] Int. Cl.⁶ ............................................... F16L 1/20
[52] U.S. Cl. .................................... 405/172; 405/158
[58] Field of Search ............................. 405/172, 158, 405/159, 169, 171, 157

[56] References Cited

U.S. PATENT DOCUMENTS 2,518,981  8/1950  Edwards ........................... 405/172 X
2,791,019  5/1957  Du Laney .......................... 405/172 X
3,240,512  3/1966  Pennington et al. ................ 405/172 X
4,166,710  7/1979  Spiridonov ........................ 405/172
5,443,329  8/1995  De Geeter ......................... 405/172

FOREIGN PATENT DOCUMENTS 629396  9/1978  U.S.S.R. ............................... 405/172

*Primary Examiner*—Tamara L. Graysay
*Assistant Examiner*—Frederick Lagman
*Attorney, Agent, or Firm*—Anthony R. Lambert

[57] ABSTRACT

A pipeline weight includes a primary body and a pair of secondary bodies pivotally connected in opposed wing-like fashion to the primary body. The secondary bodies are then secured together by bolts.

16 Claims, 3 Drawing Sheets

PIPELINE WEIGHT AND METHOD OF INSTALLING THE SAME

FIELD OF THE INVENTION

The present invention relates to weights used to anchor oil or gas pipelines.

BACKGROUND OF THE INVENTION

Weights are frequently used to anchor oil or gas pipelines. The weights presently used consist of two mating halves. A first crew of workers with a picker truck places the weights at intervals along the pipeline right of way. A second crew of workers proceed to position the two halves around the pipeline using equipment and then bolt them together. The method, as described, has a number of inherent disadvantages. It is equipment intensive as the weights weigh hundreds of pounds and equipment must be used to place and maintain each half in position while they are secured together. It is labour intensive as men are required both operate the equipment and bolt the halves together. It is time consuming.

SUMMARY OF THE INVENTION

What is required is an improved form of pipeline weight, together with a method of installing the same the overcomes the disadvantages inherent with prior art devices.

According to one aspect of the present invention there is provided a pipeline weight. In its most basic form the pipeline weight includes a primary body and a pair of secondary bodies pivotally connected in opposed wing-like fashion to the primary body. Means is provided for securing the secondary bodies together.

Although beneficial results may be obtained through the use of the pipeline weight, as described above, even more beneficial results may be obtained when the primary body has a pipe engaging seat that enables the primary body to be set in a stable position upon a pipe forming part of a pipeline.

Although beneficial results may be obtained through the use of the pipeline weight, as described above, even more beneficial results may be obtained when each of the secondary bodies is pivotally attached to the primary body by means of a hinge assembly positioned below the centre of gravity of each of the secondary bodies. With this hinge positioning the secondary bodies tend to move toward each other by force of gravity to facilitate engagement of the means for securing the secondary bodies together.

Although beneficial results may be obtained through the use of the pipeline weight, as described above, if care is not taken in arranging the weight distribution a gap will remain between the secondary bodies. This requires pipeline personnel to push the secondary bodies together in order to secure them together. Even more beneficial results may, therefore, be obtained when the majority of the weight of the secondary bodies is positioned to the outside of a vertical plane extending perpendicular to a pivot axis of the hinge assembly when the secondary bodies are in the closed position. With this weight distribution the secondary bodies remain in the closed position. This enables the secondary bodies to be easily secured together.

Although beneficial results may be obtained through the use of the pipeline weight, as described above, even more beneficial results may be obtained when each of the secondary bodies has a pipe engaging seat enabling the secondary bodies to closely engage the pipe as they move toward each other.

The primary body and each of the secondary bodies are, preferably, fabricated from reinforced concrete. Beneficial results may be obtained when the reinforced concrete has "V" shaped reinforcement members. The "V" shaped reinforcing members have ends that form a part of a hinge assembly whereby the primary body and each of the secondary bodies are pivotally connected. The bodies can be further strengthened by having longitudinal reinforcement extending between each of the "V" shaped members. To facilitate handling it is preferred that each of the secondary bodies has embedded therein means for attaching lift cables.

According to another aspect of the present invention there is provided a method of installing a pipeline weight. In its most elementary form the method includes the following steps. Firstly, provide a pipeline weight having a primary body, a pair of secondary bodies pivotally connected in opposed wing-like fashion to the primary body, and means for securing the secondary bodies together. Secondly, position the primary body in a stable position over a pipe forming part of a pipeline. Thirdly, lower the secondary bodies until they are positioned immediately adjacent each other and secure the secondary bodies together.

Although beneficial results may be obtained when the above described method is employed, even more beneficial results may be obtained with an enhanced version of the method. With the enhanced version of the method the primary body has a pipe engaging seat. This enables the primary body to be set onto a pipe forming part of a pipeline with the pipe engaging seat engaging the pipe to maintain the primary body in a stable position. With the enhanced version the hinge assembly is positioned below the centre of gravity of each of the secondary bodies. When lowering the secondary bodies they move by force of gravity into a position immediately adjacent each other that facilitates securing the secondary bodies together.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
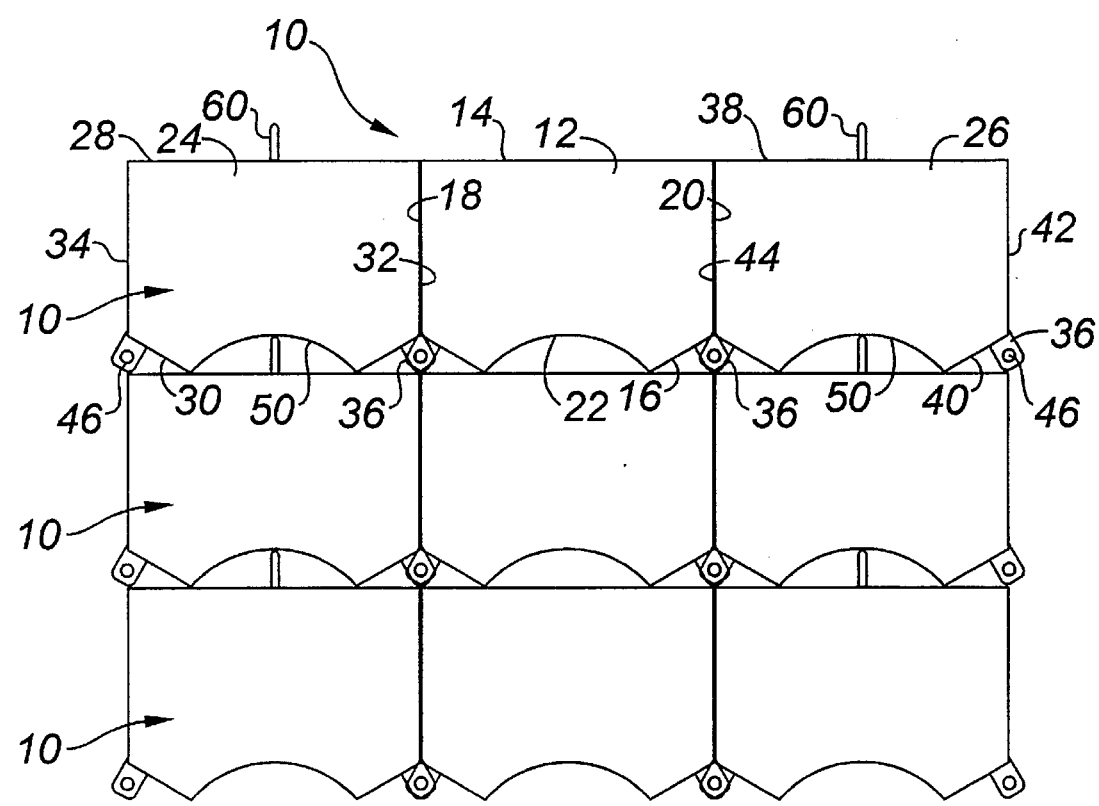
FIG. 1 is an end elevation view of a plurality of pipeline weights constructed in accordance with the teachings of the present invention.

The preferred embodiment, a pipeline weight generally identified by reference numeral 10, will now be described with reference to FIGS. 1 through 6.

Figure 2:
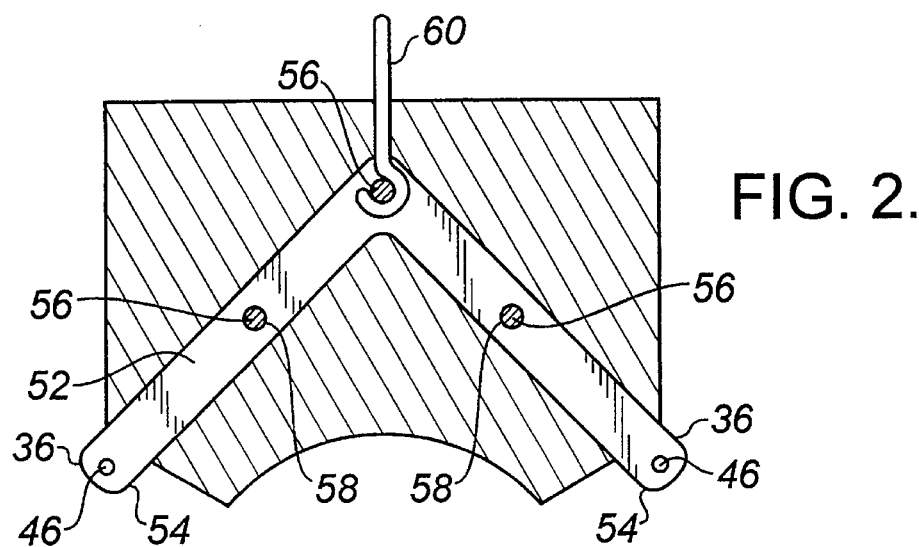
FIG. 2 is an end elevation view in section of one of the pipeline weights illustrated in FIG. 1.
Figure 3:
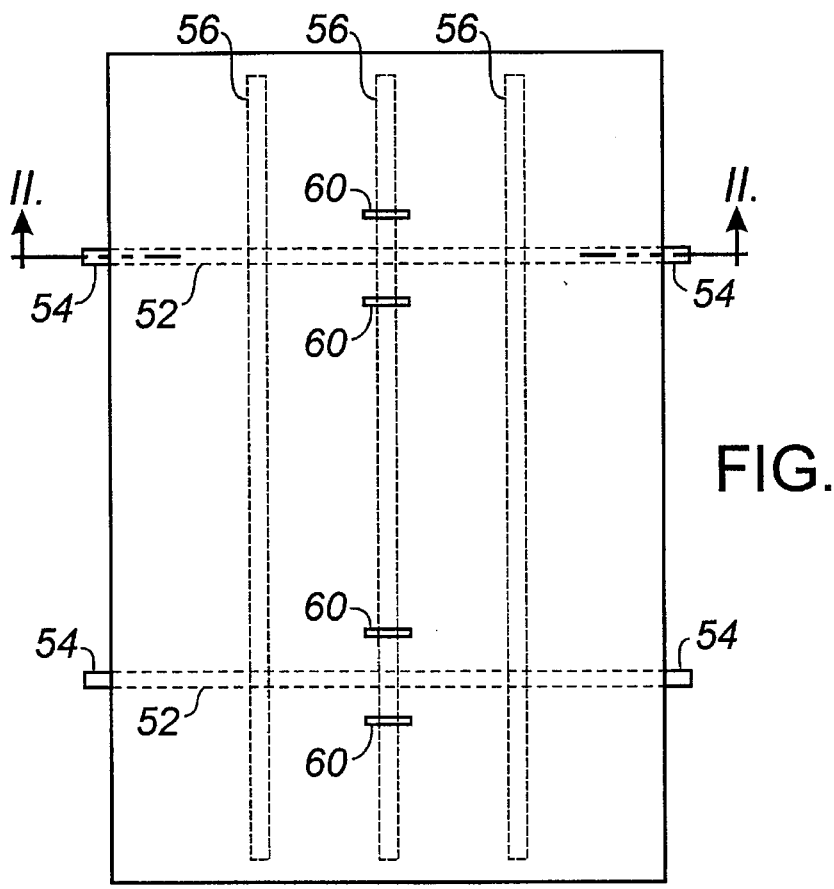
FIG. 3 is a top plan view in section of one of the pipeline weights illustrated in FIG. 1.
Figure 6:
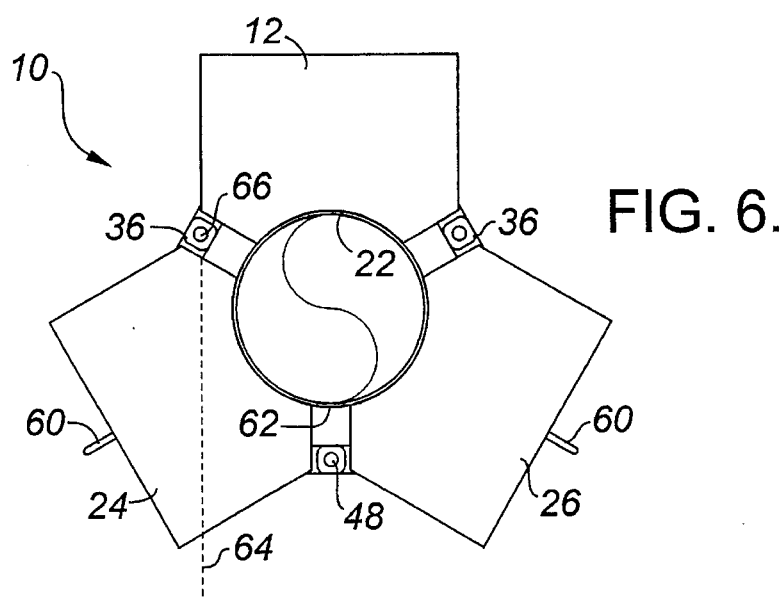
FIG. 6 is an end elevation view of the pipeline weight illustrated in FIG. 4, with the secondary bodies secured around the pipe in accordance with a third step of the method.

Referring to FIG. 1, there is illustrated a plurality of pipeline weights 10 as they would be stacked for the purpose of transport down a pipeline right of way. Each pipeline weight 10 includes a primary body 12 constructed from reinforced concrete. For the purpose of fully describing the illustrated embodiment, primary body 12 can be observed to have a top surface 14, a bottom surface 16, a first side 18 and a second side 20. Bottom surface 16 has a concave pipe engaging seat 22. Two secondary bodies, first secondary body 24 and second secondary body 26 are pivotally secured to primary body 12 in an opposed wing-like fashion. First secondary body 24 and second secondary body 26 are both constructed from reinforced concrete. First secondary body 24 has a top surface 28, a bottom surface 30, a first side 32 and a second side 34. First side 32 of first secondary body 24 is pivotally connected by means of a hinge assembly 36 to first side 18 of primary body 12. Second secondary body 26 has a top surface 38, a bottom surface 40, a first side 42, and a second side 44. Second side 44 is pivotally connected by means of another hinge assembly 36 to second side 20 of primary body 12. The means for securing first secondary body 24 to second secondary body 26 can vary. In FIG. 1, hinge assembly 36 on second side 34 of first secondary body 24 and hinge assembly 36 on first side 42 of second secondary body 26 both have apertures 46. As is illustrated in FIG. 6, aperture 46 can be aligned and a bolt 48 extended therethrough to secure first secondary body 24 to second secondary body 26. Other means for securing first secondary body 24 to second secondary body 26 would likely work equally as well. In order to ensure pipeline weight 10 functions in accordance with the preferred method of use, it is preferred that hinge assemblies 36 be positioned below the centre of gravity of secondary bodies 24 and 26. This positioning of hinge assemblies 36 results in secondary bodies 24 and 26 tending to move toward each other by force of gravity. This facilitates securing the secondary bodies together, as will hereinafter be further described. It is preferred that secondary bodies 24 and 26 each has a pipe engaging seat 50. Referring to FIGS. 2 and 3, the preferred form of reinforcement will now be described. Primary body 12 and secondary bodies 24 and 26 each have "V" shaped reinforcement members 52. "V" shaped reinforcing members 52 having ends 54 that form a part of hinge assemblies 36 as apertures 46 extends therethrough. Longitudinal reinforcing members 56 extend between each of "V" shaped members 52 passing through apertures 58 is "V" shaped members 52. Each secondary body 24 and 26 also has embedded therein hooks 60 provided for the purpose of attaching lift cables (not shown). Hooks 60 are secured to at intervals along a centrally positioned one of the longitudinal reinforcing members 56.

Figure 4:
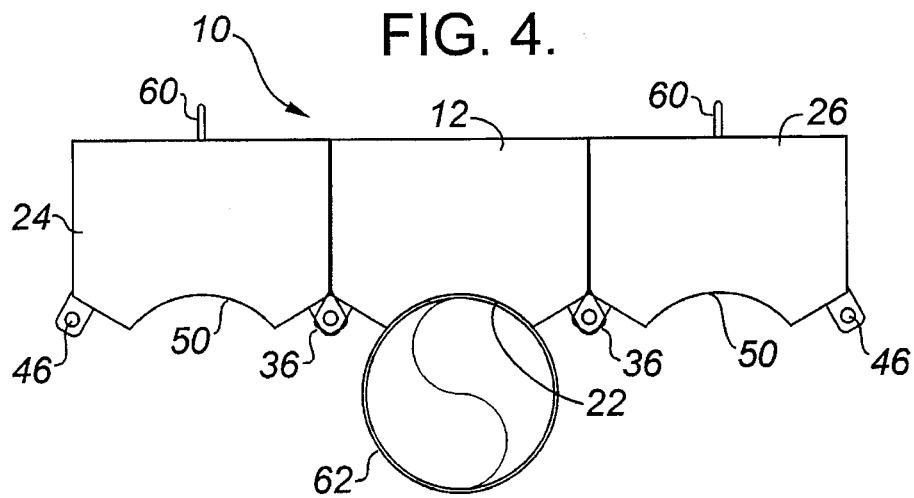
FIG. 4 is an end elevation view of one of the pipeline weights illustrated in FIG. 1, with the primary body on a pipe positioned insitu as part of a pipeline in accordance with a first step of the method.
Figure 5:
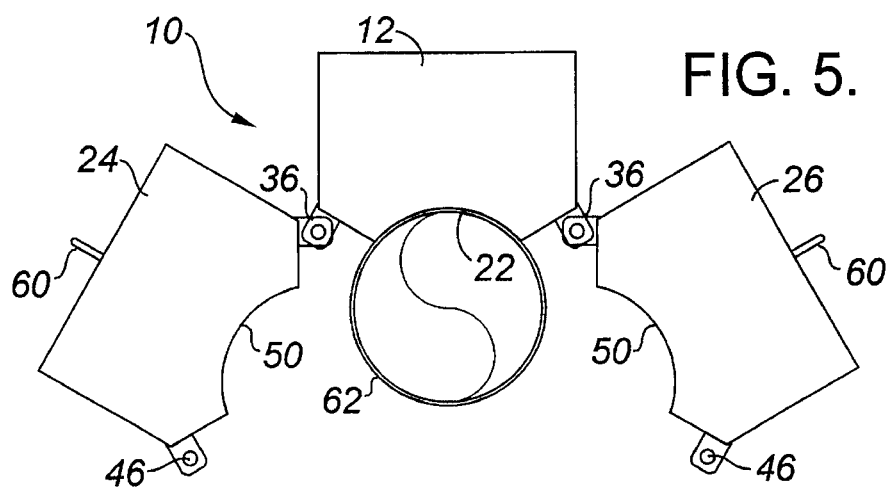
FIG. 5 is an end elevation view of the pipeline weight illustrated in FIG. 4, with the secondary bodies being lowered in accordance with a second step of the method.

The use of pipeline weight 10 in accordance with the preferred method will now be described with reference to FIGS. 1 through 6. With a rudimentary form of pipeline weight 10, the method of installing pipeline weight 10 consists of the following described steps. Firstly, referring to FIG. 4, provide a pipeline weight having primary body 12 and secondary bodies 24 and 26 pivotally connected in opposed wing-like fashion to primary body 12. Secondly, position the primary body in a stable position over a pipe 62 forming part of a pipeline (not shown). Thirdly, referring to FIGS. 5 and 6, lowering secondary bodies 24 and 26 until they are positioned in a closed position immediately adjacent each other and securing secondary bodies 24 and 26 together. As more features are added to enhance the operation of pipeline weight 10, the speed of installation using the method can be further increased. For example, when primary body 12 of pipeline weight 10 has pipe engaging seat 50, primary body 12 may be set directly onto pipe 62. Pipe engaging seat 50 engages pipe 62 to maintain primary body 12 in a stable position while installation is completed. Also, when hinge assemblies 36 are positioned below the center of gravity of secondary bodies 24 and 26, as secondary bodies 24 and 26 are lowered they move together by force of gravity until they are positioned immediately adjacent each other, as illustrated in FIG. 6 to facilitate securing them together. If care is not taken in arranging the weight distribution a gap will remain between secondary bodies 24 and 26. A gap of this nature requires pipeline personnel to push secondary bodies 24 and 26 together in order to secure them together. It is, therefore, preferred that the majority of the weight of the secondary bodies 24 and 26 be positioned to the outside of a vertical plane 64 extending perpendicular to a pivot axis 66 of hinge assembly 36 when secondary bodies 24 and 26 are in the closed position. With this weight distribution secondary bodies 24 and 26 remain in the closed position. This enables secondary bodies 24 and 26 to be easily secured together. It also makes it easier and safer to remove bolts 48 when pipeline weight 10 is being removed.

It will be apparent to one skilled in the art that pipeline weight 10 will be much more stable to work with. With two piece weights previously used in that art, there was always a danger that the one half would slide out of position as the mating half was being connected. With pipeline weight 10, as soon as secondary bodies 24 and 26 are pivoted into the closed position ⅔ of the weight is below the centre of gravity of pipe 62 and there is not the same tendency for that weight to shift. It will finally be apparent to one skilled in the art that modifications may be made to the illustrated embodiment without departing from the spirit and scope of the invention as hereinafter defined in the Claims.

The embodiments of the invention in which exclusive property or privilege is claimed are defined as follows:

1. A pipeline weight, comprising:

a primary body;

a pair of secondary bodies pivotally connected by a hinge assembly in opposed wing-like fashion to the primary body; and means for securing the secondary bodies together in a closed position.

2. The pipeline weight as defined in claim 1, wherein the primary body has a pipe engaging seat.

3. The pipeline weight as defined in claim 1, wherein each of the secondary bodies has a pipe engaging seat.

4. The pipeline weight as defined in claim 1, wherein the primary body and each of the secondary bodies are fabricated from reinforced concrete.

5. The pipeline weight as defined in claim 4, wherein the reinforced concrete has "V" shaped reinforcement members, the "V" shaped reinforcement members having ends that form a part of the hinge assemblies whereby the primary body and each of the secondary bodies are pivotally connected.

6. The pipeline weight as defined in claim 5, wherein the reinforced concrete has longitudinal reinforcement extending between each of the "V" shaped members.

7. The pipeline weight as defined in claim 1, wherein each of the secondary bodies has embedded therein means for attaching lift cables.

8. The pipeline weight as defined in claim 1, wherein each of the secondary bodies is pivotally attached to the primary body by means of a hinge assembly positioned below the centre of gravity of each of the secondary bodies such that the secondary bodies tend to move toward each other by force of gravity to facilitate engagement of the means for securing the secondary bodies together.

9. The pipeline weight as defined in claim 8, wherein the majority of the weight of the secondary bodies is positioned to the outside of a vertical plane extending perpendicular to a pivot axis of the hinge assembly when the secondary bodies are in the closed position, thereby maintaining the secondary bodies in the closed position to enable the secondary bodies to be easily secured together.

10. A pipeline weight, comprising:
   a primary body constructed from reinforced concrete, the primary body having a top surface, a bottom surface, a first side and a second side, the bottom surface having a concave pipe engaging seat;
   a first secondary body constructed from reinforced concrete, the first secondary body having a top surface, a bottom surface, a first side and a second side, the first side of the first secondary body being pivotally connected to the first side of the primary body by a hinge assembly;
   a second secondary body constructed from reinforced concrete, the second secondary body having a top surface, a bottom surface, a first side, and a second side, the second side being pivotally connected to the second side of the primary body by a hinge assembly; and
   means for securing the first secondary body to the second secondary body;
   each of the secondary bodies being pivotally attached to the primary body by means of a hinge assembly positioned below the centre of gravity of each of the secondary bodies such that the secondary bodies tend to move toward each other by force of gravity, the majority of the weight of the secondary bodies is positioned to the outside of a vertical plane extending perpendicular to a pivot axis of the hinge assembly when the secondary bodies are in the closed position, thereby maintaining the secondary bodies in the closed position to enable the secondary bodies to be easily secured together.

11. The pipeline weight as defined in claim 10, wherein each of the secondary bodies has a pipe engaging seat.

12. The pipeline weight as defined in claim 10, wherein the reinforced concrete has "V" shaped reinforcement members, the "V" shaped reinforcement members having ends that form a part of the hinge assemblies whereby the primary body and each of the secondary bodies are pivotally connected.

13. The pipeline weight as defined in claim 12, wherein the reinforced concrete has longitudinal reinforcement extending between each of the "V" shaped members.

14. The pipeline weight as defined in claim 12, wherein each secondary body has embedded therein hooks for attaching lift cables, the hooks being secured to the "V" shaped reinforcing members.

15. A method of installing a pipeline weight, comprising the steps of:
   firstly, providing a pipeline weight, comprising:
      a primary body;
      a pair of secondary bodies pivotally connected in opposed wing-like fashion to the primary body; and
      means for securing the secondary bodies together;
   secondly, positioning the primary body in a stable position over a pipe forming part of a pipeline;
   thirdly, lowering the secondary bodies until they are positioned immediately adjacent each other and securing the secondary bodies together.

16. A method of installing a pipeline weight, comprising the steps of:
   firstly, providing a pipeline weight, comprising:
      a primary body having a pipe engaging seat;
      a pair of secondary bodies pivotally connected in opposed wing-like fashion to the primary body; and
      means for securing the secondary bodies together;
      each of the secondary bodies being pivotally attached to the primary body by means of a hinge assembly positioned below the centre of gravity of each of the secondary bodies such that the secondary bodies tend to move toward each other by force of gravity to facilitate engagement of the means for securing the secondary bodies together;
   secondly, setting the primary body onto a pipe forming part of a pipeline with the pipe engaging seat engaging the pipe to maintain the primary body in a stable position; and
   thirdly, lowering the secondary bodies until by force of gravity they are positioned immediately adjacent each other and securing the secondary bodies together.

* * * * *